United States Patent
Aikawa et al.

(10) Patent No.: US 7,174,088 B2
(45) Date of Patent: Feb. 6, 2007

(54) DIGITAL SIGNAL RECORDING METHOD, DIGITAL SIGNAL REPRODUCING METHOD, DIGITAL SIGNAL RECORDING AND REPRODUCING METHOD, AND DIGITAL SIGNAL RECORDING AND REPRODUCING APPARATUS

(75) Inventors: Makoto Aikawa, Sagamihara (JP); Hiroo Okamoto, Yokohama (JP); Hitoaki Owashi, Yokohama (JP); Manabu Sasamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1155 days.

(21) Appl. No.: 09/982,174

(22) Filed: Oct. 19, 2001

(65) Prior Publication Data

US 2002/0150388 A1    Oct. 17, 2002

(30) Foreign Application Priority Data

Dec. 15, 2000    (JP)    .............................. 2000-386767

(51) Int. Cl.
*H04N 5/76* (2006.01)
*H04N 9/00* (2006.01)
*H04N 11/00* (2006.01)
*H04N 5/85* (2006.01)
*H04N 7/08* (2006.01)
*H04N 7/167* (2006.01)
*G11B 15/04* (2006.01)

(52) U.S. Cl. .............................. 386/94; 386/1; 386/95; 386/98; 386/124; 386/125; 360/60; 380/201; 380/203

(58) Field of Classification Search .................... 386/1, 386/94; 380/201, 203; 360/60
See application file for complete search history.

(56) References Cited

U.S. PATENT DOCUMENTS

| 5,987,126 A | * | 11/1999 | Okuyama et al. ........... 380/203 |
| 6,526,146 B1 | * | 2/2003 | Hashimoto et al. ......... 380/201 |
| 6,618,549 B1 | * | 9/2003 | Kato et al. .................... 386/94 |

FOREIGN PATENT DOCUMENTS

| JP | 11-328849 | 11/1999 |
| JP | 2000-76790 | 3/2000 |

* cited by examiner

*Primary Examiner*—Thai G Tran
*Assistant Examiner*—Gelek Topgyal
(74) *Attorney, Agent, or Firm*—Antonelli, Terry, Stout and Kraus, LLP.

(57) ABSTRACT

A digital signal recording and reproducing method and apparatus using first, second, third, and fourth information as information to protect a copyright, the first and second information are added to the digital signal, the third information is inputted from the digital interface together with the digital signal, a value of the fourth information is decided from a combination of the first to third information, and the fourth information is recorded onto the recording medium. The first information is information to control a copy restriction of the digital signal, the second information is information to perform a control about whether the signal is protected against the illegal use or not, the third information is information to indicate whether the signal has been encrypted or not, and the fourth information is information to control the copy restriction of the digital signal recorded on the recording medium.

7 Claims, 5 Drawing Sheets

DIGITAL SIGNAL RECORDING METHOD, DIGITAL SIGNAL REPRODUCING METHOD, DIGITAL SIGNAL RECORDING AND REPRODUCING METHOD, AND DIGITAL SIGNAL RECORDING AND REPRODUCING APPARATUS

BACKGROUND OF THE INVENTION

The invention relates to input/output method and apparatus for inputting and outputting a digital signal from a digital interface and, more particularly, to input/output method and apparatus for inputting and outputting a digital video signal or an audio signal.

According to a conventional digital signal recording and reproducing apparatus for recording a digital broadcast signal inputted from a digital interface, reproducing the recorded digital broadcast signal, and outputting it from the digital interface, upon recording, copy control information added to the digital broadcast signal is detected and a copy control regarding the recording of the digital broadcast signal is performed. Upon reproduction, the copy control information added to the digital broadcast signal reproduced from a recording medium is detected, and, for example, an encrypting process is executed in order to protect the signal which is outputted to the digital interface.

However, if the copy control information added to the digital broadcast signal indicates that the copy is possible (copy freely), upon recording, the signal is recorded onto the recording medium as a signal indicative of "copy freely" without being protected, and upon reproduction, the signal is outputted to the digital interface as a signal indicative of "copy freely" without being protected (encrypted). Therefore, even in case of the digital broadcast signal indicative of "copy freely", if the user wants to inhibit the illegal use of the signal which is recorded onto the recording medium or the signal which is outputted to the digital interface, the illegal use of such a digital broadcast signal indicative of "copy freely" cannot be prevented. The "illegal use" used here denotes that the signal recorded on the recording medium or the digital broadcast signal outputted to the digital interface is tapped and distributed in a lump to many and unspecified persons without permission by using the Internet or the like.

SUMMARY OF THE INVENTION

It is an object of the invention to provide a digital signal recording and reproducing method whereby even in case of a digital broadcast signal indicative of "copy freely", illegal use of a signal which is recorded onto a recording medium or a signal which is outputted to a digital interface can be inhibited.

To accomplish the above object, according to the invention, there is provided a digital signal recording and reproducing method of recording a digital signal inputted from a digital interface onto a recording medium and outputting the digital signal reproduced from the recording medium from the digital interface, comprising the steps of:

with respect to first, second, third, and fourth information as information to protect a copyright, adding the first and second information to the digital signal; inputting and outputting the third information to/from the digital interface together with the digital signal; and when the fourth information is stored onto the recording medium, in case of recording the digital signal, deciding a value of the fourth information from a combination of the first, second, and third information, and recording the fourth information onto the recording medium; and in case of reproducing the digital signal, deciding a value of the third information from a combination of the first, second, and fourth information and outputting the third information from the digital interface.

The first information is information to control a copy restriction of the digital signal. The second information is information to perform a control about whether the digital signal is protected against the illegal use or not. The third information is information to indicate whether the digital signal has been encrypted or not. The fourth information is information to control the copy restriction of the digital signal recorded on the recording medium.

DESCRIPTION OF THE EMBODIMENTS

An embodiment of the invention will now be described hereinbelow with reference to the drawings.

Figure 1:
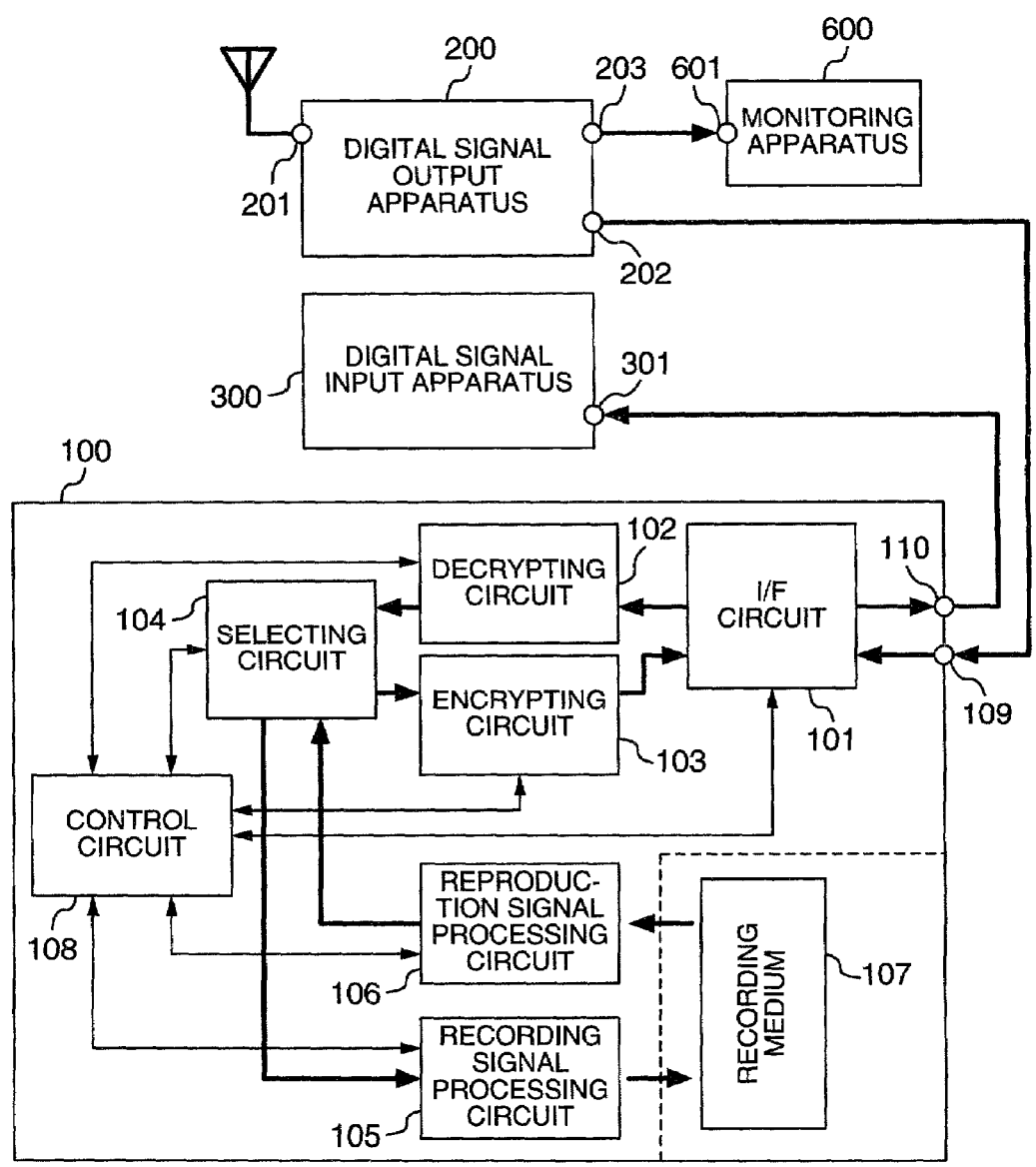
FIG. 1 is a constructional diagram in the case where a digital signal recording and reproducing apparatus according to an embodiment of the invention is connected to a digital signal output apparatus and a digital signal input apparatus.

FIG. 1 is a diagram showing an embodiment in the case where a digital signal recording and reproducing apparatus according to an embodiment of the invention is connected to a digital signal output apparatus and a digital signal input apparatus.

Reference numeral 100 denotes a digital signal recording and reproducing apparatus such as digital VTR, digital disk recorder, or the like for recording a digital broadcast signal inputted from a digital interface onto a recording medium, reproducing the digital broadcast signal recorded on the recording medium, and outputting it from the digital interface.

A compressed digital video signal, a compressed digital audio signal, and the like have been divided and multiplexed into a packet for the digital broadcast signal and stored into the digital broadcast signal. In case of transferring the digital broadcast signal by the digital interface, the digital broadcast signal packet is stored into a packet for the digital interface and transferred.

The digital signal recording and reproducing apparatus 100 includes: an interface circuit 101; a decoding circuit 102 for decoding a scramble of the signal inputted from the digital interface; an encrypting circuit 103 for scrambling the signal which is outputted to the digital interface; a selecting circuit 104 for selecting the packet of the digital broadcast signal; a recording signal processing circuit 105 for performing a process for recording the digital broadcast signal onto the recording medium; a reproduction signal processing circuit 106 for performing a process for reproducing the digital broadcast signal from the recording medium; a recording medium 107 for recording the digital broadcast signal; and a control circuit 108.

When the digital broadcast signal is inputted to the digital signal recording and reproducing apparatus 100, the packet for the digital broadcast signal is extracted from the packet for the digital interface by the interface circuit 101. Subsequently, if the digital broadcast signal has been encrypted, a decrypting process of the packet for the digital broadcast signal is executed by the decrypting circuit 102. Next, the packet for the digital broadcast signal in which the video data and audio data which are recorded have been stored is selected by the selecting circuit 104. After that, the digital broadcast signal is recorded onto the recording medium 107 by the recording signal processing circuit 105. The digital broadcast signal can be also converted into another packet format and recorded onto the recording medium 107. The digital broadcast signal can be also recorded without being converted into the packet. The recording medium 107 can be also constructed like a cassette tape or the like which can be freely removed from the digital signal recording and reproducing apparatus 100.

In the case where the digital signal recording and reproducing apparatus 100 reproduces the digital broadcast signal, the digital broadcast signal recorded on the recording medium 107 is first read out by the reproduction signal processing circuit 106. Subsequently, the packet for the digital broadcast signal in which the video data and audio data which are reproduced have been stored is selected from the digital broadcast signal read out by the selecting circuit 104. Next, in case of encrypting the digital broadcast signal and outputting it from the digital interface, an encrypting process is executed by the encrypting circuit 103. After that, the interface circuit 101 stores the packet for the digital broadcast signal into the packet for the digital interface and outputs it from a digital output terminal 110. The above processes are executed under the control by the control circuit 108. As mentioned above, the recording medium 107 can be also constructed so that it can be freely removed from the digital signal recording and reproducing apparatus 100. The digital broadcast signal recorded on the recording medium 107 can be also the signal recorded by another recording apparatus.

The digital broadcast signal is inputted from a digital input terminal 109 to the digital signal recording and reproducing apparatus 100. A digital signal output apparatus 200 such as a digital broadcast receiver or the like generates the digital broadcast signal which is inputted to the digital signal recording and reproducing apparatus 100. The digital signal output apparatus 200 outputs the digital broadcast signal obtained by demodulating a reception signal received through an antenna from a digital output terminal 202. As shown in FIG. 1, the digital signal output apparatus 200 can also convert the digital broadcast signal into an analog signal and output it from an analog output terminal 203 to a monitoring apparatus 600.

The digital broadcast signal is inputted from the digital signal recording and reproducing apparatus 100 through the digital output terminal 110. The digital broadcast signal outputted from the digital signal recording and reproducing apparatus 100 is inputted from a digital input terminal 301 to a digital signal input apparatus 300 such as a digital TV or the like and, for example, displayed on a screen.

Figure 2:
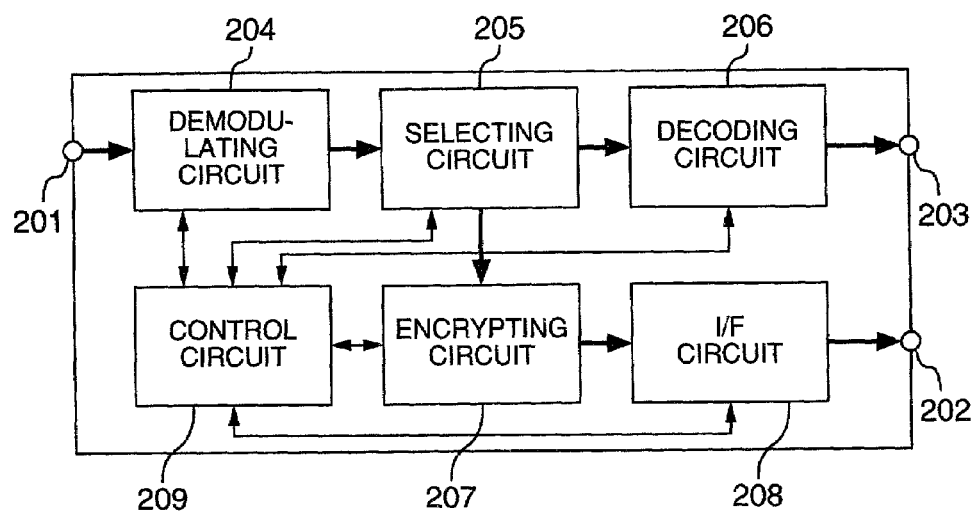
FIG. 2 is a constructional diagram of the digital signal output apparatus.

FIG. 2 shows an internal constructional diagram of the digital signal output apparatus 200. The digital signal output apparatus 200 comprises: a demodulating circuit 204; a selecting circuit 205; a decoding circuit 206; an encrypting circuit 207; an interface circuit 208; and a control circuit 209. The reception signal received by the digital signal output apparatus 200 through the antenna is inputted to the demodulating circuit 204 from an input terminal 201. The demodulating circuit 204 demodulates a radio wave of a frequency which is received, demodulates the digital broadcast signal, and inputs it to the selecting circuit 205. The selecting circuit 205 selects the packet for the digital broadcast signal in which the video data and audio data which are outputted have been stored. The selected packet for the digital broadcast signal is inputted to the encrypting circuit 207 and subjected to an encrypting process for protecting the data which is outputted from the digital interface. Subsequently, it is stored into the packet for the digital interface by the interface circuit 208 and outputted from the digital output terminal 202. The output of the selecting circuit 205 is inputted to the decoding circuit 206, converted into an analog video signal and an analog audio signal, and outputted as analog signals from the analog output terminal 203. The above processes which are executed by the digital signal output apparatus 200 are controlled by the control circuit 209. The digital signal output apparatus 200 is not limited to the apparatus for outputting the received digital broadcast signal but can be also replaced with an apparatus for outputting the signal reproduced from the recording medium.

Figure 3:
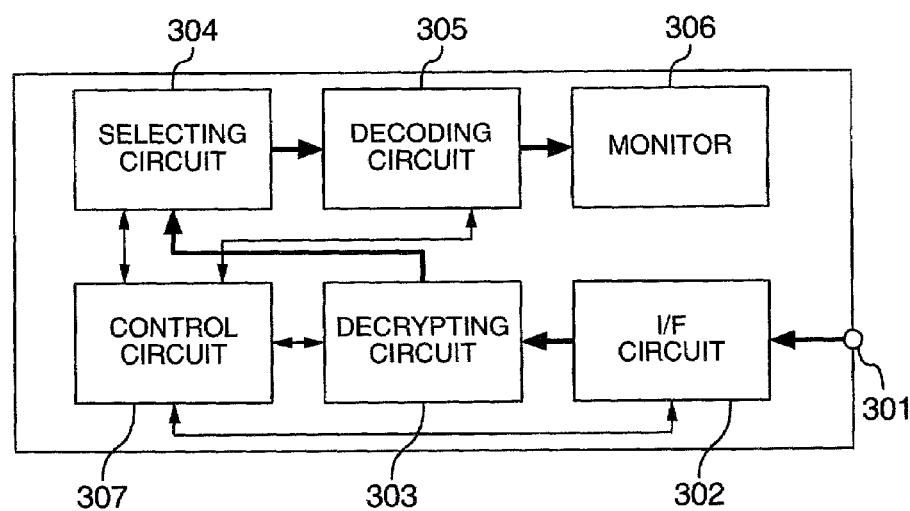
FIG. 3 is a constructional diagram of the digital signal input apparatus.

FIG. 3 shows an internal constructional diagram of the digital signal input apparatus 300. The digital signal input apparatus 300 comprises: an interface circuit 302; a decrypting circuit 303; a selecting circuit 304; a decoding circuit 305; a monitor 306; and a control circuit 307. The digital broadcast signal inputted from the digital input terminal 301 is supplied to the interface circuit 302, by which the packet for the digital broadcast signal is extracted from the packet for the digital interface. Subsequently, if the digital broadcast signal has been encrypted, a decrypting process of the packet for the digital broadcast signal is executed by the decrypting circuit 303. Next, the selecting circuit 304 selects the packet for the digital broadcast signal in which the video data and audio data which are displayed have been stored. The selected packet for the digital broadcast signal is inputted to the decoding circuit 305, converted into an analog video signal and an analog audio signal, and displayed by the monitor 306. The above processes which are executed by the digital signal input apparatus 300 are controlled by the control circuit 307. The digital signal input apparatus 300 is not limited to the apparatus for displaying the inputted digital broadcast signal onto the screen, but can be also replaced with, for example, an apparatus for recording the signal onto the recording medium.

As described above, the digital signal recording and reproducing apparatus 100 has a function for receiving the digital broadcast signal outputted by the digital signal output apparatus 200 and recording it onto the recording medium. The apparatus 100 also has a function for outputting the digital broadcast signal reproduced from the recording medium to the digital signal input apparatus 300.

Figure 4:
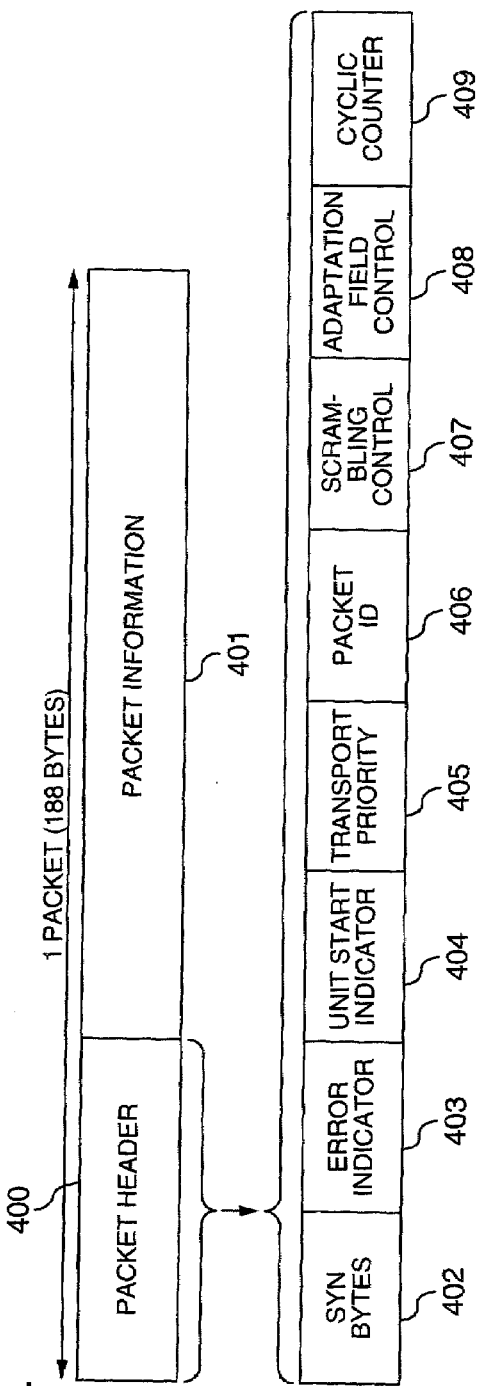
FIG. 4 is a constructional diagram of a packet for a digital broadcast signal.

Subsequently, a construction of the packet for the digital broadcast signal will be described. FIG. 4 is a constructional diagram of the packet for the digital broadcast signal. A length of one packet for the digital broadcast signal is fixed to, for example, 188 bytes, and this packet is constructed by: a packet header 400 of 4 bytes; and packet information 401 of 184 bytes. The packet header 400 comprises: sync bytes 402 indicative of the head of the packet; an error indicator 403 showing the presence or absence of an error of the packet; a unit start indicator showing the start of a unit; a transport priority 405 showing a significance degree of the packet; a packet ID 406 showing the kind of packet; a scrambling control 407 showing the presence or absence of the scramble; adaptation field control 408 showing the presence or absence of additional information and the presence or absence of the packet information; and a cyclic counter 409 which is counted up on a packet unit basis.

The video data, audio data, and the like are stored in the packet information 401. Which kind of data is included in the packet information 401 is identified by the packet ID 406. Data including the copy control information of the digital broadcast signal is also stored into the packet information 401. As copy control information, for example, information of two bits is used, thereby indicating three states of "copy freely", "copy one generation", and "copy never". If there is no copy control information, it is also possible to indicate "copy freely" or "copy never". Further, copy freely signal protection information as information to perform a control about whether the digital broadcast signal is protected against the illegal use or not is also stored into the packet information 401. As copy freely signal protection information, for example, information of one bit is used, thereby showing two states of "protection" and "non-protection". If the copy freely signal protection information indicates "protection", for example, it is regarded that the digital broadcast signal is set to "copy freely" irrespective of a value of the copy control information. However, by using an encrypting process or the like, the digital broadcast signal is protected. If the copy freely signal protection information does not exist, either "protection" or "non-protection" can be also indicated.

Figure 5:
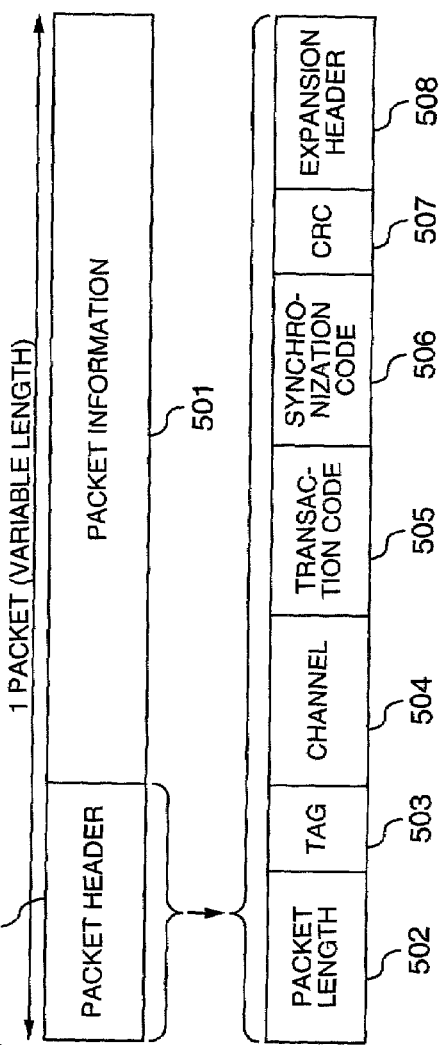
FIG. 5 is a constructional diagram of a packet for a digital interface.

A construction of the packet for the digital interface will now be described. FIG. 5 is a constructional diagram of the packet for the digital interface. A length of one packet for the digital interface is set to a variable length. For example, the packet for the digital interface is constructed by: a packet header 500 of 16 bytes; and packet information 501. The packet header 500 comprises: a packet length 502 indicative of a length of packet information; a tag 503 indicative of a format of the packet; a channel 504 for identifying the packet; a transaction code 505 indicative of a kind of packet; a synchronization field 506 which is used for transmitting and receiving synchronization information between the transmission side and the reception side; a CRC 507; and an expansion header 508.

The packet for the digital broadcast signal shown in FIG. 4 is stored into the packet information 501. There is a case where the packet for the digital broadcast signal which is stored into the packet information 501 has already been encrypted in order to protect the digital broadcast signal. Encrypting mode information showing whether the packet information 501 has already been encrypted or not is stored in the synchronization field 506. As encrypting mode indicator, for example, information of 2 bits is used, thereby showing four states of "copy freely", "copy one generation", "no more copies", and "copy never". The states other than "copy freely" indicate that the packet information 501 has been encrypted. The term "no more copies" denotes that although the state was inherently "copy one generation", since data has been recorded once, the apparatus enters a state where the copy is no longer possible. The encrypting mode indicator is set by the apparatus for sending the data to the digital interface.

When the digital signal recording and reproducing apparatus 100 records the digital broadcast signal inputted from the digital interface onto the recording medium 107, recording medium copy control information indicative of the copy control information of the data to be recorded is written onto the recording medium 107 simultaneously with the digital broadcast signal. As recording medium copy control information, for example, information of 2 bits is used, thereby showing four states of "copy freely", "copy one generation", "no more copies", and "copy never". It is also possible to construct the recording medium copy control information in a manner such that in case of the state other than "copy freely", the data to be written onto the recording medium is encrypted in order to protect it. Upon recording of the digital broadcast signal, the recording medium copy control information is determined on the basis of: the copy control information included in the digital broadcast signal; the copy freely signal protection information included in the digital broadcast signal; and the encrypting mode indicator included in the header of the packet for the digital interface.

When the digital signal recording and reproducing apparatus 100 reproduces the digital broadcast signal recorded on the recording medium 107 and outputs it from the digital interface, the encrypting mode indicator which is set into the header of the packet for the digital interface is determined on the basis of: the recording medium copy control information recorded on the recording medium 107; the copy control information included in the digital broadcast signal; and the copy freely signal protection information included in the digital broadcast signal.

The setting of the recording medium copy control information upon recording of the digital broadcast signal and the setting of the encrypting mode indicator upon reproduction of the digital broadcast signal are performed under the control of the control circuit 108 of the digital signal recording and reproducing apparatus 100. The detection of the copy control information and the copy freely signal protection information is performed by the selecting circuit 104. The setting of the recording medium copy control information is performed by the recording signal processing circuit 105. The detection of the recording medium copy control information is performed by the reproduction signal processing circuit 106. The detection and the setting of the encrypting mode indicator are performed by the interface circuit 101.

A setting method of the recording medium copy control information upon recording of the digital broadcast signal will now be described with reference to the following tables.

Table 1 shows a case where the copy freely signal protection information included in the digital broadcast signal indicates "non-protection" as an example of the setting method of the recording medium copy control information upon recording of the digital broadcast signal.

TABLE 1

|  |  | Encrypting mode indicator | | | |
|---|---|---|---|---|---|
|  |  | Copy freely | Copy one generation | No more copies | Copy never |
| Copy control information | Copy freely | Copy freely | Copy freely | Copy freely | Copy freely |
|  | Copy one generation | No more copies | No more copies | No more copies | No more copies |

TABLE 1-continued

| | Encrypting mode indicator | | | |
|---|---|---|---|---|
| | Copy freely | Copy one generation | No more copies | Copy never |
| Copy never | Not recorded | Not recorded | Not recorded | Not recorded |

In this case, when the copy control information indicates "copy freely", the recording medium copy control information is set to "copy freely" and the digital broadcast signal which is recorded is not protected. When the copy control information indicates "copy one generation", the recording medium copy control information is set to "no more copies" and the digital broadcast signal which is recorded is set to a state where the copy is no longer possible. When the copy control information indicates "copy never", the digital broadcast signal is not recorded.

Table 2 shows a case where the copy freely signal protection information included in the digital broadcast signal indicates "protection" as an example of the setting method of the recording medium copy control information upon recording of the digital broadcast signal.

TABLE 2

| | | Encrypting mode indicator | | | |
|---|---|---|---|---|---|
| | | Copy freely | Copy one generation | No more copies | Copy never |
| Copy control information | Copy freely | Copy one generation | Copy one generation | Copy one generation | Copy one generation |
| | Copy one generation | Copy one generation | Copy one generation | Copy one generation | Copy one generation |
| | Copy never | Copy one generation | Copy one generation | Copy one generation | Copy one generation |

In this case, in all combinations of the copy control information and the encrypting mode indicator, the recording medium copy control information is set to "copy one generation" and the digital broadcast signal is recorded. Therefore, when the copy freely signal protection information indicates "protection", although the copy control is not performed, the data on the recording medium can be protected.

In the above example, when the copy freely signal protection information indicates "protection", the whole digital broadcast signal is recorded as "copy one generation" irrespective of the value of the copy control information. However, for example, it is also possible to construct the apparatus in a manner such that only when the value of the copy control information indicates "copy never", even if the copy freely signal protection information indicates protection, the digital broadcast signal is not recorded onto the recording medium.

For example, in the case where the digital broadcast signal such that the value of the copy control information indicates "copy freely" and the value of the copy freely signal protection information indicates "protection" is recorded by the digital signal recording and reproducing apparatus 100, as shown in Table 3, since the recording medium copy control information is recorded as "copy one generation" onto the recording medium, even if this recording medium is reproduced by a recording and reproducing apparatus which cannot detect the copy freely signal protection information, the data which is outputted from the digital interface can be protected. A deciding method of the encrypting mode indicator upon reproduction of the digital broadcast signal will now be described with reference to the following tables.

Table 3 shows a case where the copy freely signal protection information included in the digital broadcast signal is "non-protection" as a deciding method of the encrypting mode indicator upon reproduction of the digital broadcast signal.

TABLE 3

| | | Recording medium copy indicatior | | | |
|---|---|---|---|---|---|
| | | Copy freely | Copy one generation | No more copies | Copy never |
| Copy control information | Copy freely | Copy freely | Copy one generation | No more copies | Copy never |
| | Copy one generation | Copy one generations | Copy one generation | No more copies | Copy never |
| | Copy never | Copy never | Copy never | Copy never | Copy never |

In this case, a value of more severe restriction is set as encrypting mode indicator by a combination of the copy control information and the recording medium copy control information. Therefore, the digital broadcast signal in which both of the copy control information and the recording medium copy control information indicate "copy freely" is not encrypted when it is outputted from the digital interface.

Table 4 shows a case where the copy freely signal protection information included in the digital broadcast signal is "protection" as a deciding method of the encrypting mode indicator upon reproduction of the digital broadcast signal.

TABLE 4

| | | Recording medium copy indicatior | | | |
|---|---|---|---|---|---|
| | | Copy freely | Copy one generation | No more copies | Copy never |
| Copy control information | Copy freely | Copy one generation | Copy one generation | Copy one generation | Copy one generation |
| | Copy one generation | Copy one generation | Copy one generation | Copy one generation | Copy one generation |
| | Copy never | Copy one generation | Copy one generation | Copy one generation | Copy one generation |

In this case, in all combinations of the copy control information and the recording medium copy control information, the encrypting mode indicator is set to "copy one generation". Thus, the digital broadcast signal is certainly encrypted when it is outputted from the digital interface. Therefore, when the copy freely signal protection information indicates "protection", although the copy control is not performed, the data which is outputted from the digital interface can be protected.

In the above example, when the copy freely signal protection information indicates "protection", the encrypting mode indicator is certainly set to "copy one generation". However, for example, it is also possible to construct the apparatus in a manner such that only when the value of the copy control information indicates "copy never", the encrypting mode indicator is set to "copy never" and the signal is outputted.

For example, in the case where the digital broadcast signal such that the value of the copy control information indicates "copy freely" and the value of the copy freely signal protection information indicates "protection" is recorded onto the recording medium by a recording and reproducing apparatus which cannot detect the copy freely signal protection information, the value of the recording medium copy control information which is recorded onto the recording medium usually indicates "copy freely". Therefore, in case of reproducing the recording medium by the same recording and reproducing apparatus, the data which is outputted from the digital interface is not protected. However, if the recording medium is reproduced by the digital signal recording and reproducing apparatus 100, since the copy freely signal protection information can be detected, the data which is outputted from the digital interface can be protected as described by using Table 4.

A case where a digital signal recording apparatus according to the second embodiment of the invention is connected to the digital signal output apparatus will now be described with reference to the drawing.

Figure 6:
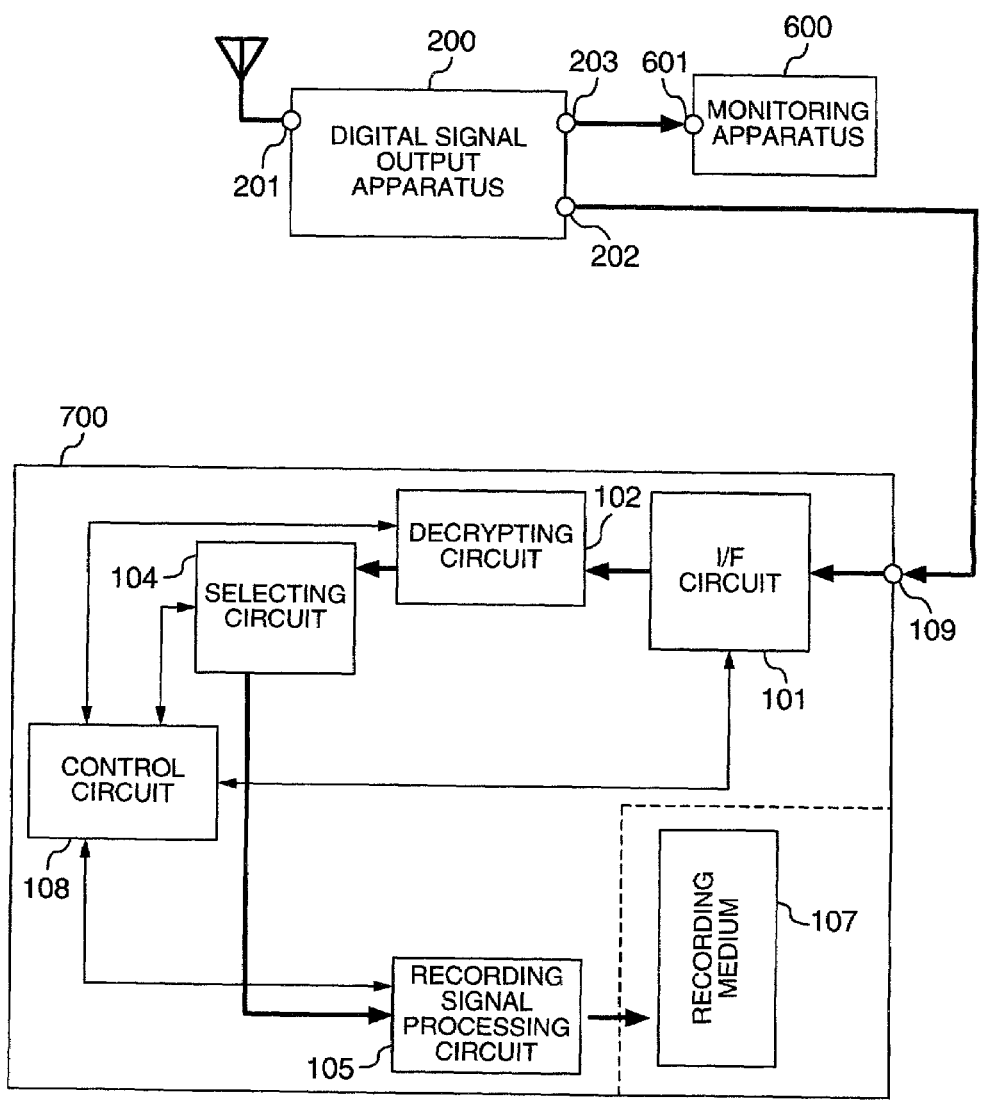
FIG. 6 is a constructional diagram in the case where a digital signal recording apparatus according to the embodiment of the invention is connected to the digital signal output apparatus.

FIG. 6 is a constructional diagram in the case where the digital signal recording apparatus according to the invention is connected to the digital signal output apparatus.

A digital signal recording apparatus 700 shown in FIG. 6 is equivalent to an apparatus obtained by omitting the reproducing function from the digital signal recording and reproducing apparatus 100 described in the first embodiment. For example, the setting method of the recording medium copy control information described by using Tables 1 and 2 is executed upon recording of the digital broadcast signal.

A case where a digital signal reproducing apparatus according to the third embodiment of the invention is connected to the digital signal input apparatus will now be described with reference to the drawing.

Figure 7:
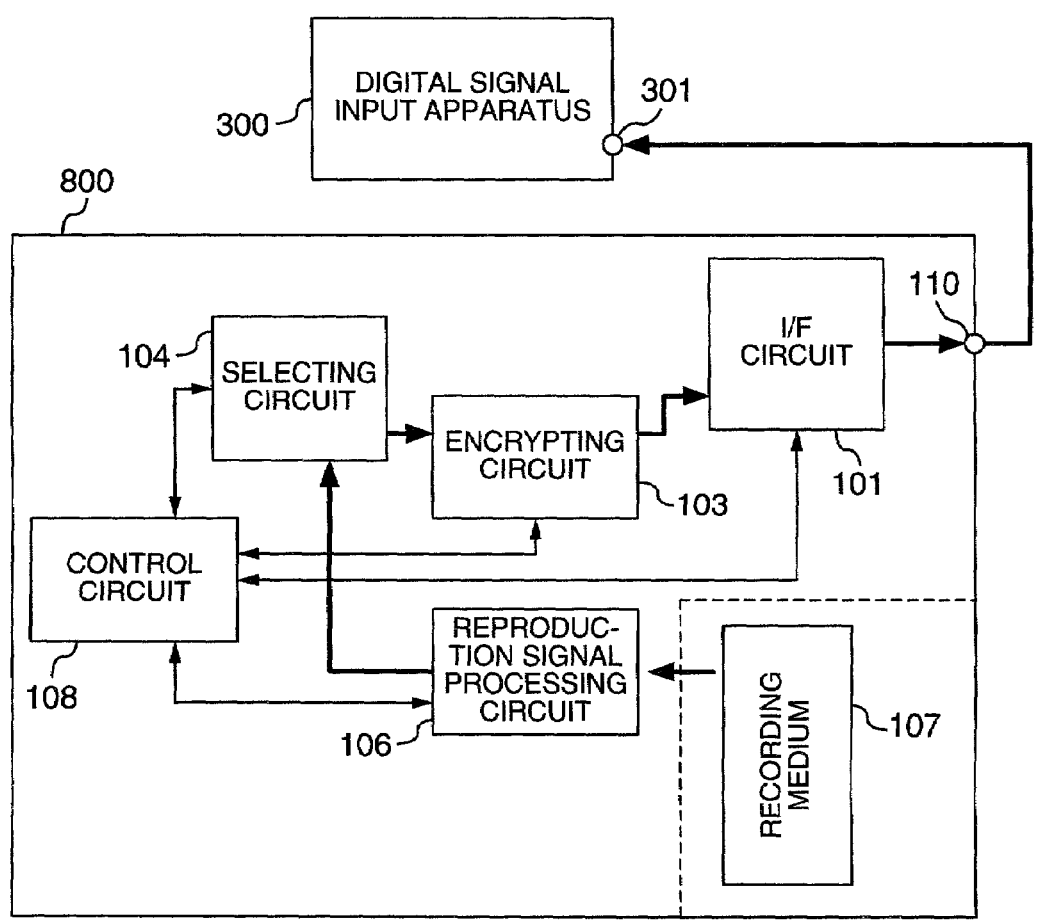
FIG. 7 is a constructional diagram in the case where a digital signal reproducing apparatus according to the embodiment of the invention is connected to the digital signal input apparatus.

FIG. 7 is a constructional diagram in the case where the digital signal reproducing apparatus according to the invention is connected to the digital signal input apparatus.

A digital signal reproducing apparatus 800 shown in FIG. 7 is equivalent to an apparatus obtained by omitting the recording function from the digital signal recording and reproducing apparatus 100 described in the first embodiment. For example, the setting method of the encrypting mode indicator described by using Tables 3 and 4 is executed upon reproduction of the digital broadcast signal.

As mentioned above, according to the invention, even in case of the copy freely digital broadcast signal, the digital signal recording and reproducing method and apparatus which can inhibit the illegal use of the signal that is recorded onto the recording medium and the signal which is outputted to the digital interface can be provided.

What is claimed is:

1. A digital signal recording method of recording a digital signal included in a digital packet input via a digital interface, comprising:

providing a packet information area for storing said digital signal and a packet header area for storing additional information of said packet information area to said digital packet;

storing first information indicative of copy restriction of said digital signal and second information for setting necessity of protection by encryption of said packet information area in said packet information area;

storing third information indicative of status of encryption of said packet information area in said packet header; and determining fourth information indicative of copy restriction of a digital signal to be recorded to a recording medium on a basis of combination of said first, second and third information and recording said fourth information in said recording medium, when a digital signal has been input via said digital interface, wherein said fourth information is set so as to indicate "once copy is enabled" under conditions that said first information is indicative of "copy is enabled without restriction of copy times", and said second information being indicative of "protection is necessary", and said third information is indicative of "once copy is enabled".

2. A digital signal recording apparatus, comprising:

a digital interface;

means for recording a digital signal included in a digital packet input via said digital interface, said digital packet including a packet information area for storing said digital signal and a packet header area for storing additional information of said packet information area, said packet information area including first information indicative of copy restriction of said digital signal and second information for setting necessity of protection by encryption of said packet information area, and said packet header including third information indicative of status of encryption of said packet information area; and means for determining fourth information indicative of copy restriction of a digital signal to be recorded to a recording medium on a basis of combination of said first, second and third information and recording said fourth information in said recording medium, when a digital signal has been input via said digital interface, wherein said fourth information is set so as to indicate "once copy is enabled" under conditions that said first information is indicative of "copy is enabled without restriction of copy times", and said second information is indicative of "protection is necessary", and said third information is indicative of "once copy is enabled".

3. A digital signal reproducing method of storing a digital signal reproduced from a recording medium into a digital packet and outputting said digital packet from a digital interface, comprising:

providing a packet information area for storing said digital signal and a packet header area for storing additional information of said packet information area to said digital packet; and when a first information indicative of copy restriction of said digital signal and a second information for setting necessity of protection by encryption of said packet information area are added to said digital signal, and fourth information indicative of copy restriction of a digital signal recorded in a recording medium is recorded in said recording medium, determining a value of third information included in said packet header area indicative of status of encryption of said packet information area on a basis of combination of said first, second and fourth information and outputting said third information from said digital interface, wherein said third information is set so as to indicate "once copy is enabled" under conditions that said first information is indicative of "copy is enabled without restriction of copy tines", and said second information is indicative of "protection is necessary", and said fourth information is indicative of "once copy is enabled".

4. A digital signal reproducing apparatus, comprising:

a digital interface;

means for storing a digital signal reproduced from a recording medium in a digital packet and outputting said digital packet from said digital interface, said digital packet including a packet information area for storing said digital signal and a packet header area for storing additional information of said packet information area; and when a first information indicative of copy restriction of said digital signal and a second information for setting necessity of protection by encryption of said packet information area are added to said digital signal, and fourth information indicative of copy restriction of a digital signal recorded in said recording medium is recorded in said recording medium, means for determining a value of third information included in said packet header area indicative of status of encryption of said packet information area on a basis of combination of said first, second and fourth information and outputting said third information from said digital interface, wherein said third information is set so as to indicate "once copy is enabled" under conditions that said first information is indicative of "copy is enabled without restriction of copy times", and said second information is indicative of "protection is necessary", and said fourth information is indicative of "once copy is enabled".

5. A digital signal recording and reproducing method of recording a digital signal included in a digital packet input via a digital interface and storing a digital signal reproduced from a recording medium in a digital packet and outputting said digital packet from said digital interface, comprising:

providing a packet information area for storing said digital signal and a packet header area for storing additional information of said packet information area to said digital packet;

when a digital signal is recorded under conditions that first information indicative of copy restriction of said digital signal and second information for setting necessity of protection by encryption of said packet information area are stored in said packet information area, and third information indicative of status of encryption of said packet information area is stored in said packet header area, and fourth information indicative of copy restriction of a digital signal to be recorded in a recording medium is recorded in said recording medium, determining said fourth information on a basis of combination of said first, second and third information and recording said fourth information in said recording medium, wherein said fourth information is set so as to indicate "once copy is enabled" and recorded in said recording medium under conditions that said first information is indicative of "copy is enabled without restriction of copy times", and said second information is indicative of "protection is necessary", and said third information being indicative of "once copy is enabled"; and when said digital signal is reproduced, determining a value of said third information indicative of status of encryption of said packet information area on a basis of combination of said first, second and fourth information and outputting said third information from said digital interface, wherein said third information is set so as to indicate "once copy is enabled" under conditions that said first information is indicative of "copy is enabled without restriction of copy times", said second information is indicative of "protection is necessary", and said fourth information is indicative of "once copy is enabled".

6. A digital signal recording and reproducing apparatus, comprising:

a digital interface;

means for recording a digital signal included in a digital packet input via said digital interface in a recording medium, said digital packet including a packet information area for storing said digital signal and a packet header area for storing additional information of said packet information area;

means for storing a digital signal reproduced from a recording medium in a digital packet and outputting said digital packet from said digital interface;

when a digital signal is recorded under conditions that a first information indicative of copy restriction of said digital signal and a second information for setting necessity of protection by encryption of said packet information area are stored in said packet information area, and a third information indicative of status of encryption of said packet information area is stored in said packet header area, and a fourth information indicative of copy restriction of a digital signal to be recorded in a recording medium is recorded in said recording medium, means for determining said fourth information on a basis of combination of said first, second and third information and recording said fourth information in said recording medium, wherein said fourth information is set so as to indicate "once copy is enabled" and recorded to said recording medium under conditions that said first information is indicative of "copy is enabled without restriction of copy times", said second information is indicative of "protection is necessary" and said third information is indicative of "once copy is enabled"; and when said digital signal is reproduced, means for determining a value of said third information indicative of status of encryption of said packet information area on a basis of combination of said first, second and fourth information and outputting said third information from said digital interface, wherein said third information is set so as to indicate "once copy is enabled" and output from said digital interface under conditions that said first information is indicative of "copy is enabled without restriction of copy times", and said second information is indicative of "protection is necessary", and said fourth information is indicative of "once copy is enabled".

7. A recording apparatus, comprising:

an interface to which a digital data is input, said digital data including first information relating to copy control information, second information relating to status of encryption and third information relating to necessity of encryption;

a recording medium for recording said digital data input from said interface; and control means for controlling a recording operation to said recording medium in a manner that when said first information is indicative of "copy is enabled without restriction of copy times", and said second information is indicative of "once copy is enabled", and said third information is indicative of "protection is necessary", information relating to copy restriction of a digital data to be recorded in said recording medium is set to "once copy is enabled" and recorded in said recording medium.

* * * * *